United States Patent
Kranz

(10) Patent No.: US 7,971,907 B2
(45) Date of Patent: Jul. 5, 2011

(54) SEAT BELT BUCKLE

(75) Inventor: Christopher Joe Kranz, Troy, MI (US)

(73) Assignee: TK Holdings Inc., Auburn Hills, MI (US)

( * ) Notice: Subject to any disclaimer, the term of this patent is extended or adjusted under 35 U.S.C. 154(b) by 129 days.

(21) Appl. No.: 12/385,146

(22) Filed: Mar. 31, 2009

(65) Prior Publication Data

US 2010/0244423 A1 Sep. 30, 2010

(51) Int. Cl.
*B60R 22/00* (2006.01)

(52) U.S. Cl. ..................... 280/801.1; 297/468

(58) Field of Classification Search .............. 24/625, 24/629, 633, 265 BC; 280/801.1, 805, 808; 297/468, 470, 471, 472, 473
See application file for complete search history.

(56) References Cited

U.S. PATENT DOCUMENTS

| | | | | |
|---|---|---|---|---|
| 3,287,061 A | * | 11/1966 | Nicholas | 297/481 |
| 4,638,534 A | * | 1/1987 | Sasaki et al. | 24/683 |
| 4,645,231 A | * | 2/1987 | Takada | 280/801.1 |
| 5,961,147 A | * | 10/1999 | Wier | 280/801.1 |
| 6,092,875 A | * | 7/2000 | Pleyer | 297/470 |
| 6,746,048 B2 | * | 6/2004 | Tajima et al. | 280/801.1 |
| 7,063,389 B2 | * | 6/2006 | Kennedy, Sr. | 297/483 |
| 2006/0255647 A1 | * | 11/2006 | Hyatt et al. | 297/481 |
| 2008/0296881 A1 | * | 12/2008 | Richter et al. | 280/801.1 |

* cited by examiner

*Primary Examiner* — Eric Culbreth
*Assistant Examiner* — Joseph Rocca
(74) *Attorney, Agent, or Firm* — Foley & Lardner LLP

(57) ABSTRACT

A vehicle seat belt assembly comprises a vehicle seat configured to contain a seat occupant; a seat belt webbing mountable to the vehicle seat and connected to a latch plate, wherein the latch plate is configured to be releasably connected to a seat belt buckle in order to secure the webbing in a position capable of restraining the occupant; and a buckle strap mountable to a portion of the vehicle seat or vehicle structure and connected to the buckle, wherein the buckle strap includes a plurality of brackets configured to attach to a buckle component. Additionally, a vehicle seat belt assembly could comprise a buckle strap and buckle frame manufactured as a single component.

6 Claims, 6 Drawing Sheets

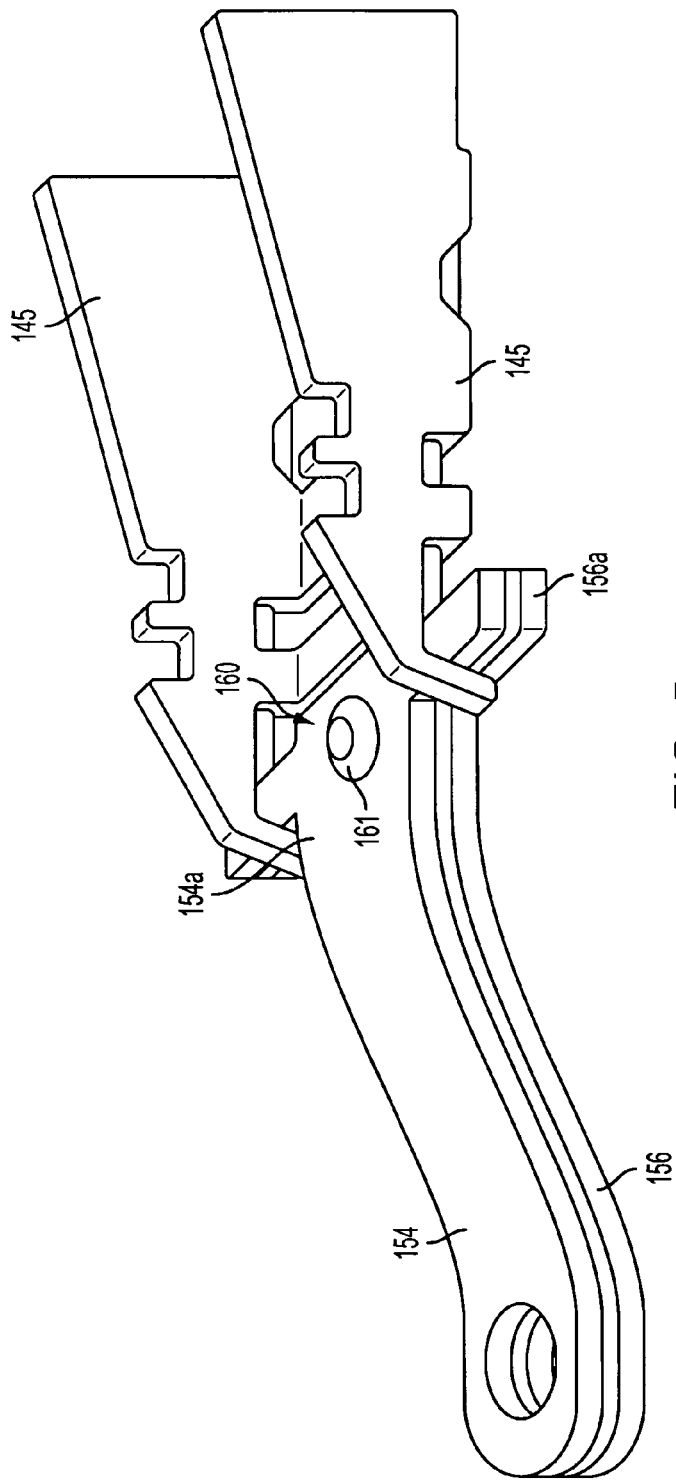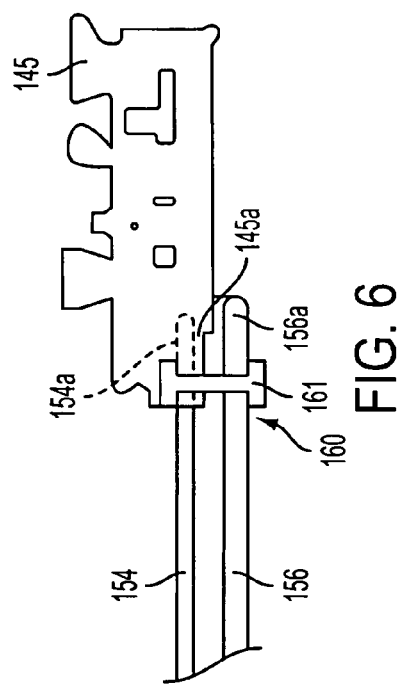

SEAT BELT BUCKLE

BACKGROUND

The present invention relates generally to the field of vehicle seat belt assemblies, specifically seat belt buckles and buckle straps.

Seat belt designs have been known to use a buckle strap to connect a seat belt buckle to a portion of a vehicle seat or other vehicle structure. As shown in FIG. 1, current designs include a buckle strap 50 consisting of a single plate member connected to a buckle frame 40 by an attaching rivet 60 so as to form a single shear connection. As shown in FIG. 2, current designs also utilize a webbing 70 looped at one end through an opening in a buckle frame 80. The webbing 70 may then be fastened at another end to a portion of the vehicle seat or vehicle structure. There is a need for a seat belt design which provides a seat belt buckle and buckle frame with increased strength and improved energy absorbing capability with regard to current designs.

SUMMARY

According to a disclosed embodiment, a vehicle seat belt assembly includes a vehicle seat configured to contain a seat occupant; a seat belt webbing mountable to the vehicle seat or a vehicle structure and connected to a latch plate, wherein the latch plate is configured to be releasably connected to a seat belt buckle in order to secure the webbing in a position capable of restraining the occupant; and a buckle strap mountable to a portion of the vehicle seat or vehicle structure and connected to the buckle, wherein the buckle strap includes a plurality of brackets configured to attach to a buckle component.

According to another disclosed embodiment, a vehicle seat belt assembly includes a vehicle seat configured to contain a seat occupant; a seat belt webbing mountable to the vehicle seat or a vehicle structure and connected to a latch plate, wherein the latch plate is configured to be releasably connected to a seat belt buckle having a buckle frame in order to secure the webbing in a position capable of restraining the occupant; and a buckle strap mountable to a portion of the vehicle seat or vehicle structure, wherein the buckle strap and buckle frame are manufactured as a single component.

BRIEF DESCRIPTION OF THE DRAWINGS

FIG. 5 is a top perspective view of a seat belt buckle and buckle strap connected by an attachment device according to an embodiment of the invention.

FIG. 6 is a cross-sectional side view of a seat belt buckle and buckle strap connected by an attachment device according to an embodiment of the invention.

DETAILED DESCRIPTION

Referring to the FIGURES generally, a vehicle seat belt assembly includes a buckle strap mountable to a vehicle seat portion or other vehicle structure and connected to a seat belt buckle. According to one embodiment, the buckle strap comprises a plurality of brackets configured to attach to a component of the buckle. According to another embodiment, the plurality of brackets are attached to the component of the buckle by an attachment device such that the attachment device forms a double shear connection. This embodiment provides the vehicle seat belt assembly with significant energy absorption capability. This embodiment may be implemented in most seat belt buckle assemblies without any complicated tooling changes. According to another embodiment, the buckle strap and a buckle are a single component.

Figure 1:
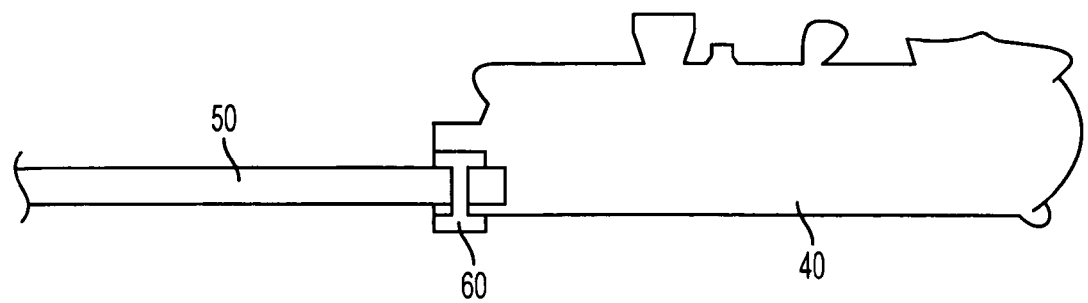
FIG. 1 is a cross-sectional side view of an exemplary prior art buckle strap and buckle example.
Figure 2:
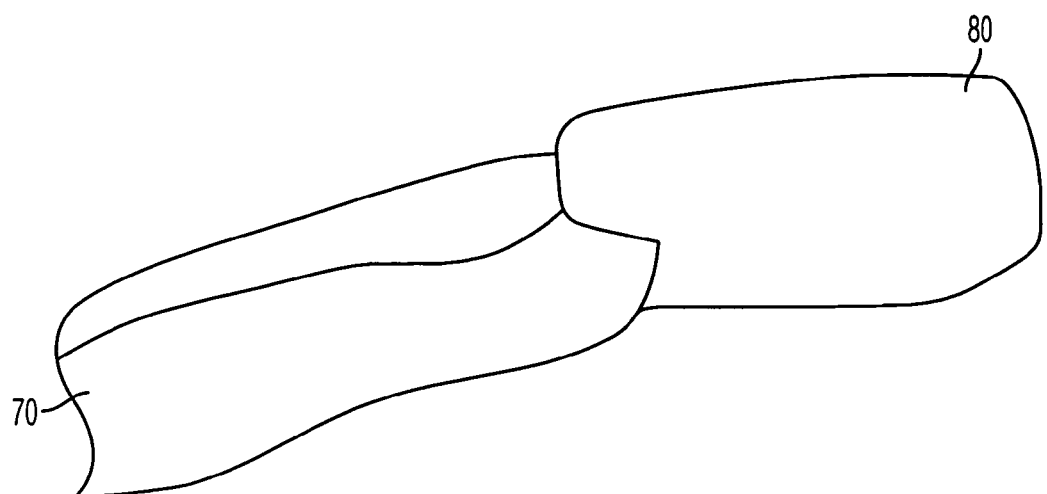
FIG. 2 is a side perspective view of another exemplary prior art buckle strap and buckle.
Figure 3:
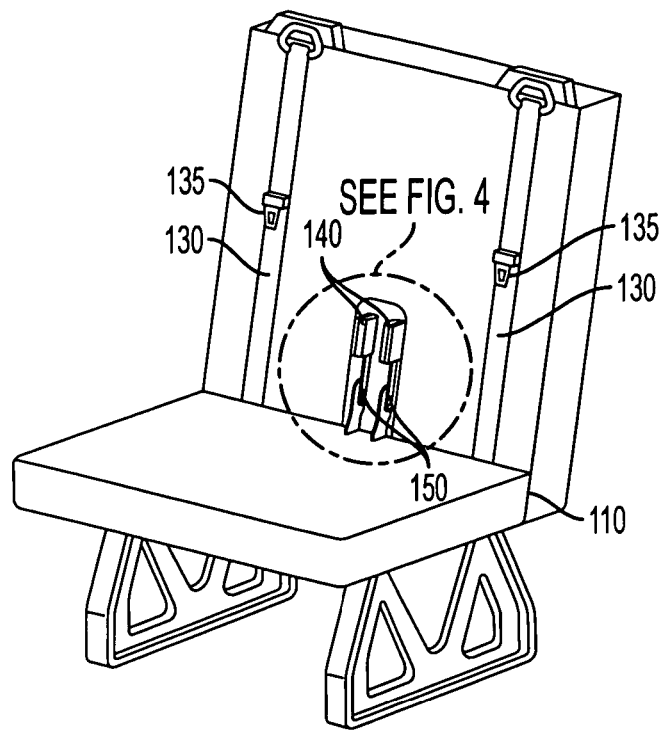
FIG. 3 is front perspective view of a vehicle seat according to an embodiment of the invention.
Figure 4:
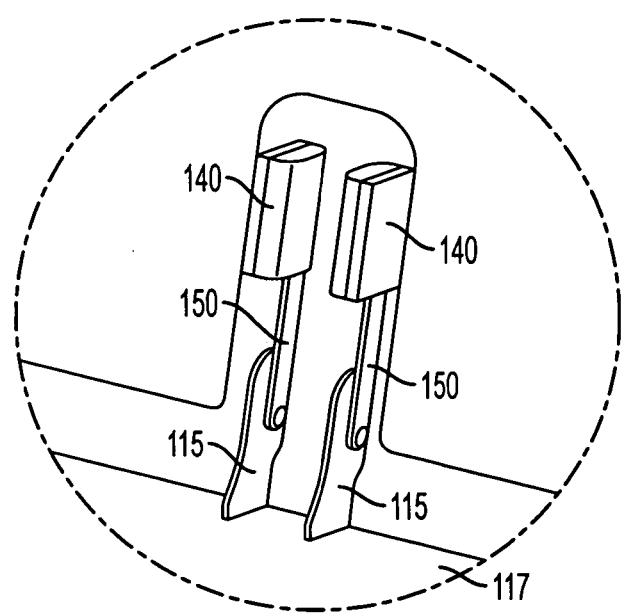
FIG. 4 is a close-up perspective view of seat belt buckle and buckle strap attaching to a vehicle seat according to an embodiment of the invention.

According to FIGS. 3-4, an embodiment of a vehicle seat belt assembly comprises a vehicle seat 110 configured for containing a seat occupant. The vehicle seat 110 as shown in FIG. 3 is a bus seat, but it should be understood that the embodiments of the invention are not limited to situations in which the vehicle seat 110 is a bus seat. The vehicle seat belt assembly may be applied to vehicle seats for any passenger, commercial, aviation, or military use, as well as any other useful application. A seat belt webbing 130 is shown mountable to the vehicle seat 110. The seat belt webbing 130 includes a latch plate 135. The latch plate 135 is configured to be releasably connected to a seat belt buckle 140. When the latch plate 135 is secured in the buckle 140, the webbing 130 is configured to restrain the seat occupant when the seat occupant is suddenly propelled forward, such as in a vehicle crash. The buckle 140 includes a buckle frame 145 configured to provide structural support to other components of the buckle 140.

A buckle strap 150 is used to connect the buckle 140 to a vehicle portion 115 of a vehicle seat 110. The vehicle portion 115 is shown in FIG. 4 as a metal projection extending from a vehicle seat cross-bar 117. The buckle strap 150 may be mounted to the vehicle portion 115 of a vehicle seat 110 according to any fastening mechanism known to those skilled in the art, such as a nut and bolt assembly.

As shown in FIGS. 5-6, the buckle strap 150 may comprise two brackets 154,156 such that bracket 154 is superimposed on bracket 156. Brackets 154, 156 are shown in FIG. 5 as separate metal plates. The brackets 154 and 156 are spaced apart from each other to allow for insertion of a seat belt buckle component. The brackets 154, 156 may extend from the vehicle portion 115 towards the buckle 140 in a substantially parallel arrangement.

Front portions 154a, 156a of brackets 154, 156 terminate proximal to a rear portion 145a of the buckle frame 145 of the buckle 140. The rear portion 145a of the buckle frame 145 is inserted between the front portions 154a, 156a of the brackets 154, 156 such that bracket front portion 154a is directly above buckle frame rear portion 145a, and bracket front portion 156a is directly below buckle frame rear portion 145a.

Figure 6A:
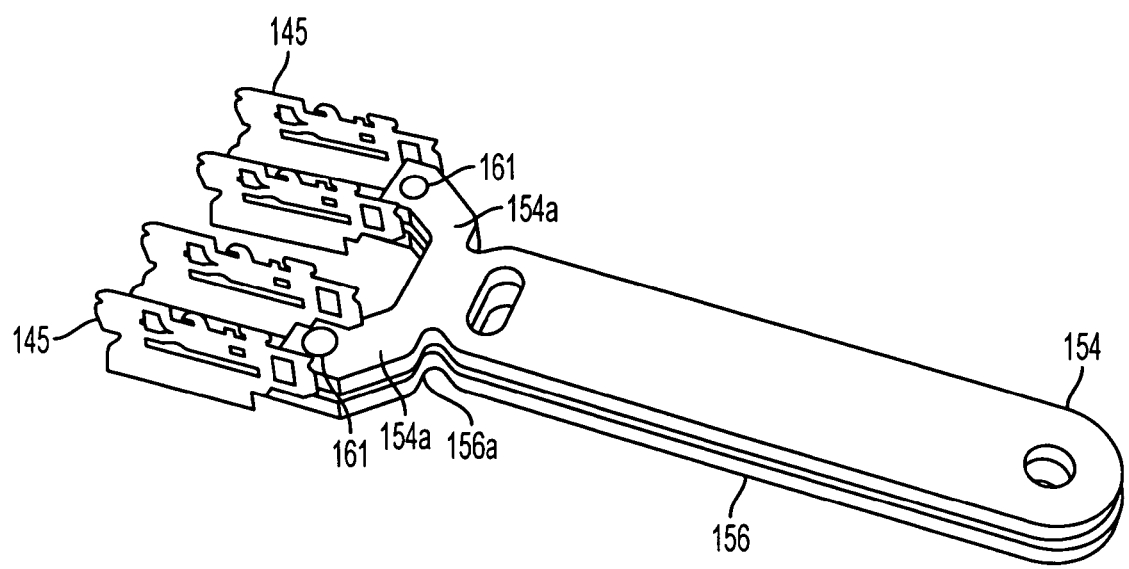
FIG. 6A is a perspective top view of two seat belt buckles connected to a single buckle strap according an embodiment of the invention.
Figure 9:
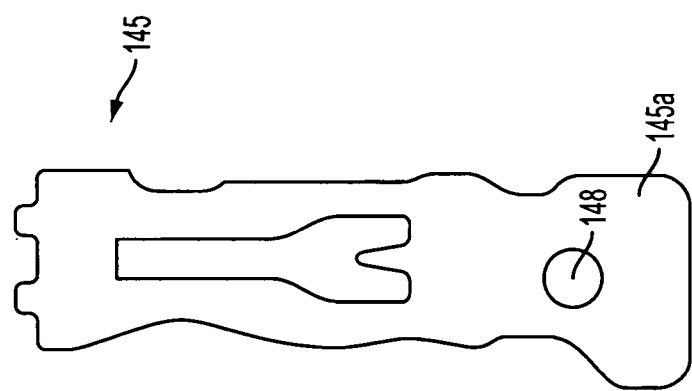
FIG. 9 is a top view of a buckle frame according to an embodiment of the invention.
Figure 8:
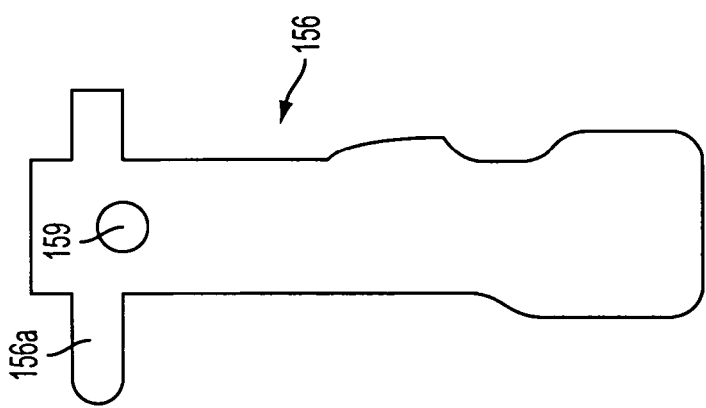
FIG. 8 is a top view of another component of a buckle strap according to an embodiment of the invention.
Figure 7:
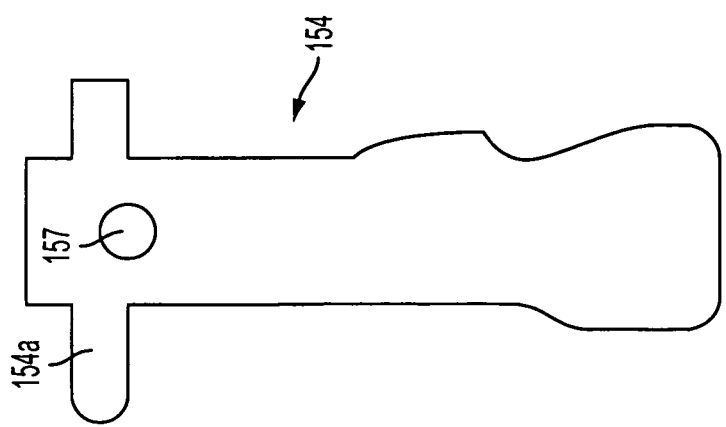
FIG. 7 is a top view of a component of a buckle strap according to an embodiment of the invention.

As shown in FIGS. 7-9, front portions 154a, 156a of brackets 154 and 156 each have openings 157, 159. Rear buckle frame portion 145a also includes an opening 148. It should be understood that possible buckle strap and buckle frame profiles are not limited to what is shown in FIGS. 7-9 and the shown profiles are exemplary only. When the bracket front portions 154a, 156a sandwich buckle frame rear portion 145a as previously described, the openings 157, 148, and 159 should be aligned so that an attachment device 160 may connect and secure the brackets 154, 156 to the buckle frame 140. The attachment device 160 is any component or combination of components insertable through the openings 157, 148, and 159 and configured to secure the brackets 154, 156 to the buckle frame 140. The attachment device 160 may include, but is not limited to rivets, screws, bolts (with or without a washer), etc. In FIGS. 5-6A, the attachment device 160 is a rivet 161.

After the rivet 161 is inserted through openings 157, 148, and 159 and after the tail of the rivet 161 is deformed, the rivet 161 provides a secure connection between the brackets 154, 156 and the buckle frame 140. When a force is exerted on the buckle 140 including buckle frame 145, the buckle frame rear portion 145a exerts shear stress against the rivet 161. The shear stress occurs along two planes perpendicular to the axis of the shaft of the rivet 161. Thus, the rivet 161 is in a double shear connection.

According to one example of the embodiment, as shown in FIG. 6A, the buckle strap 150 may be designed so that two buckle frames 145 are each connected to brackets 154, 156 by a rivet 161. It should be understood that a single buckle frame 145 or a plurality of buckle frames 145 may be attached to a buckle strap 150 by an attachment device 160.

It should be understood that instead of using an attachment device 160, the buckle frame 145 and the brackets 154, 156 can be welded together. Thus, a weld connecting front portions 154a, 156a to the rear portion 154a forms double shear connection.

The buckle frame 140, buckle strap 150, and the attachment device 160 may be made out of many different materials known to those skilled in the art. The choice of material may be tailored to meet manufacturer needs, such as energy absorption. Examples of materials that may be used include steel (1010, e.g.), stainless steel (304, e.g.), magnesium, aluminum, titanium, or a composite of materials.

The material thickness of the components buckle frame 140, buckle strap 150, and attachment device 160 is variable and may also be tailored to meet manufacturer needs, such as energy absorption. For example, the rivet 161 may have a shaft about 8 mm in diameter, and thus, the openings 157, 148, and 159 may each have an 8 mm diameter.

The attachment device 160 in FIGS. 5-6 is a rivet 161 shown having a cylindrical-shaped shaft with a semi-circular-shaped head and deformed tail. However, it should be understood that the shape of the attachment device 160 is variable and the shape of the components of the attachment device 160 may be, for example, rectangular, square, polygonal, or any other geometry. If the attachment device 160 is generally non-circular, it may have anti-rotational properties which may be advantageous in certain situations.

Figure 10:
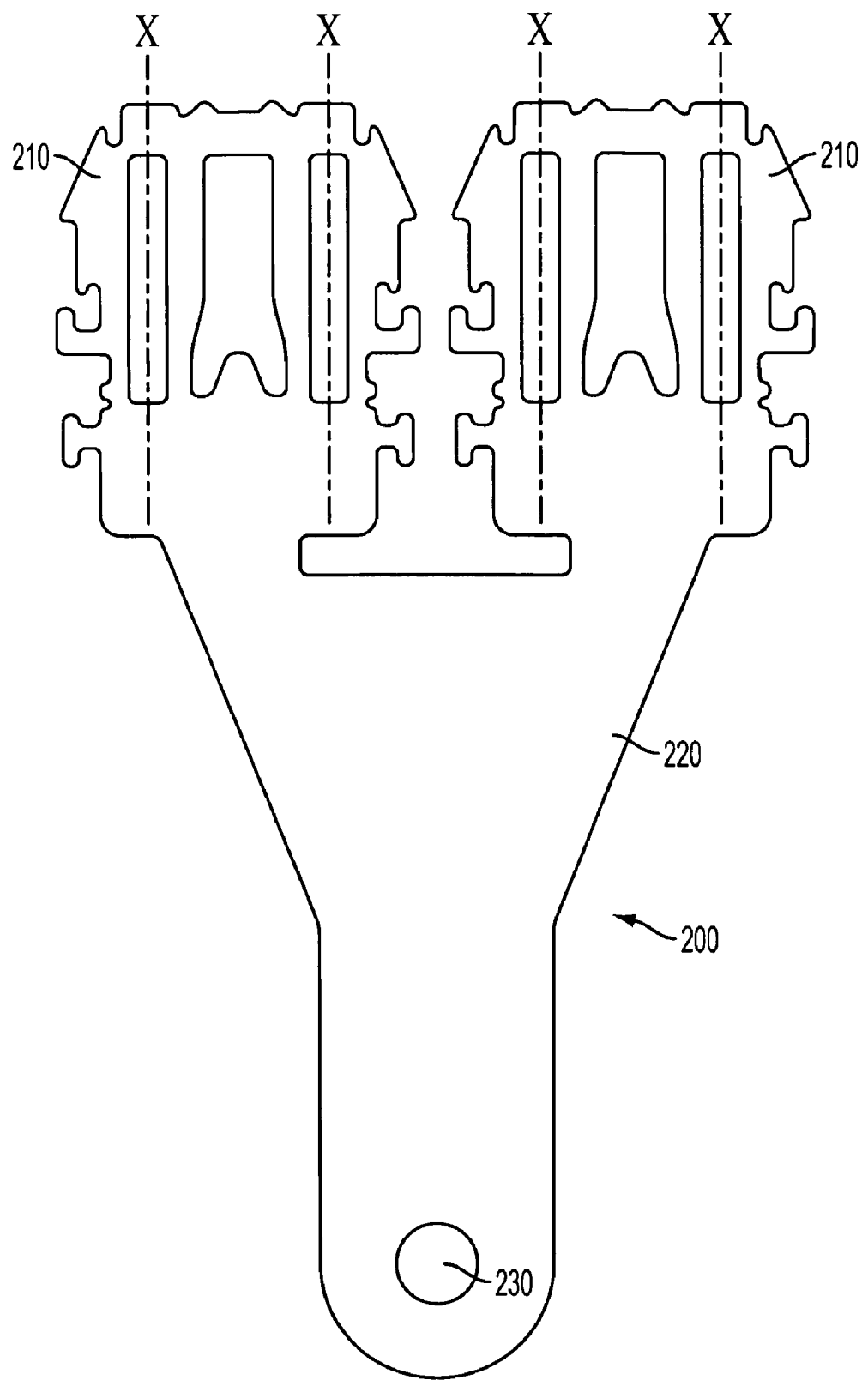
FIG. 10 is a cross sectional top view of a set belt buckle and buckle strap according to another embodiment of the invention.

According to another embodiment, a seat belt buckle having a buckle frame portion 210 and a buckle strap portion 220 are single-formed, that is, they are manufactured as a single component 200. The single component 200 may be manufactured by any method known to those skilled in the art to produce a single piece, such as by, for example, one piece stamping. As shown in FIG. 10, in an embodiment having a single component 200, there is no need for an attachment device 160. Because the need for an attachment device is eliminated, the buckle frame portion 210 and the buckle strap portion 220 are attached without an attachment device being in single shear. This provides the single component 200 with increased energy absorption capability. This is particularly true when the attachment device 160 is considered the weak point of an assembly.

The single component 200, as shown in FIG. 10, shows two buckle frame portions 210 formed with a single buckle strap portion 220. It should be understood that a single buckle frame portion 210 or any plurality of buckle frame portions 210 may be formed with a buckle strap portion 220. The single component 200 may require additional alterations after it has been manufactured by, for example, one piece stamping. The buckle frame portions 210 are shown with fold lines "X", showing how walls of the buckle frame portions 210 can be created after the single component 200 has been formed. The buckle strap portion 220 of the single component 200 includes an opening 230 for attachment to a vehicle portion 115 of a vehicle seat 110 or other vehicle structure.

It should be understood that the single component 200 may be made out of many different materials known to those skilled in the art. The choice of material may be tailored to meet manufacturer needs, such as energy absorption. Examples of materials that may be used include steel (1010, e.g.), stainless steel (304, e.g.), magnesium, aluminum, titanium, or a composite of materials. The material thickness of the portions of the single component 200 is variable and may also be tailored to meet manufacturer needs, such as energy absorption.

It is important to note that the construction and arrangement of the seat belt buckle and buckle strap designs as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:
1. A vehicle seat belt assembly, comprising:
a vehicle seat configured to contain a seat occupant;
a seat belt webbing mountable to the vehicle seat or a vehicle structure and connected to a latch plate, wherein the latch plate is configured to be releasably connected to a seat belt buckle in order to secure the webbing in a position capable of restraining the occupant; and
a buckle strap mountable to a portion of the vehicle seat or vehicle structure and connected to the buckle, wherein the buckle strap includes a plurality of brackets configured to attach to a buckle component, wherein the buckle component is a buckle frame, and wherein at least two of the plurality of brackets attach to opposing planes of the buckle frame.

2. The vehicle seat assembly of claim 1, wherein an attachment device connects at least two brackets and the buckle frame such that the attachment device is in a double shear connection.

3. The vehicle seat assembly of claim 2, wherein the attachment device is a rivet, screw, or bolt.

4. The vehicle seat assembly of claim 2, wherein the buckle strap connects to two buckle frames.

5. The vehicle seat assembly of claim 4, wherein each buckle frame is attached to the buckle strap by at least two of the plurality of brackets.

6. The vehicle seat assembly of claim 1, wherein at least two brackets are welded to the buckle frame.

* * * * *